(12) United States Patent
Lee (10) Patent No.: US 10,795,911 B2
(45) Date of Patent: Oct. 6, 2020

(54) APPARATUS AND METHOD FOR REPLICATING CHANGED-DATA IN SOURCE DATABASE MANAGEMENT SYSTEM TO TARGET DATABASE MANAGEMENT SYSTEM IN REAL TIME

(71) Applicant: DataStreams Corp., Seoul (KR)

(72) Inventor: WooJune Lee, Seoul (KR)

(73) Assignee: DataStreams Corp., Seoul (KR)

( * ) Notice: Subject to any disclaimer, the term of this patent is extended or adjusted under 35 U.S.C. 154(b) by 164 days.

(21) Appl. No.: 15/909,360

(22) Filed: Mar. 1, 2018

(65) Prior Publication Data

US 2018/0253483 A1    Sep. 6, 2018

(30) Foreign Application Priority Data

Mar. 6, 2017   (KR) ........................ 10-2017-0028525

(51) Int. Cl.
*G06F 16/27* (2019.01)
*G06F 11/14* (2006.01)
*G06F 16/23* (2019.01)
*G06F 16/17* (2019.01)
*G06F 11/20* (2006.01)

(52) U.S. Cl.
CPC .......... *G06F 16/27* (2019.01); *G06F 11/1402* (2013.01); *G06F 11/2097* (2013.01); *G06F 16/1734* (2019.01); *G06F 16/23* (2019.01); *G06F 16/2358* (2019.01); *G06F 11/2035* (2013.01); *G06F 2201/80* (2013.01); *G06F 2201/855* (2013.01)

(58) Field of Classification Search
None
See application file for complete search history.

(56) References Cited

U.S. PATENT DOCUMENTS

| 7,769,722 | B1 * | 8/2010 | Bergant | ................ | G06F 16/184 |
| | | | | | 707/681 |
| 2002/0049776 | A1 * | 4/2002 | Aronoff | ................ | G06F 16/178 |
| 2018/0046551 | A1 * | 2/2018 | Bourbonnais | ....... | G06F 11/1451 |

FOREIGN PATENT DOCUMENTS

| KR | 10-0503899 B1 | 7/2006 |
| KR | 10-0891036 B1 | 3/2009 |
| KR | 10-0926880 B1 | 11/2009 |
| KR | 10-1374533 B1 | 3/2014 |

* cited by examiner

*Primary Examiner* — Kris E Mackes
*Assistant Examiner* — Cao D Vuong
(74) *Attorney, Agent, or Firm* — Novick, Kim & Lee, PLLC; Jae Youn Kim (57) ABSTRACT

Provided are an apparatus and a method for replicating changed-data in a source database management system to a target database management system in real time, for minimizing the load on the source DBMS system, reducing costs for DBMS hardware configuration, and facilitating operation and failure recovery. The source server transmits the changed-data from a redo log file or an archive log file in a source DBMS area to a target server in real time, and the target server receives the changed-data transmitted from the source server to temporarily store the changed-data in a local area, and extracts the change data stored in the local area to replicate the extracted changed-data to the target DBMS, thereby implementing the apparatus for replicating the changed-data in the source database management system to the target database management system in real time.

6 Claims, 6 Drawing Sheets

APPARATUS AND METHOD FOR REPLICATING CHANGED-DATA IN SOURCE DATABASE MANAGEMENT SYSTEM TO TARGET DATABASE MANAGEMENT SYSTEM IN REAL TIME

BACKGROUND OF THE INVENTION

1. Field of the Invention

The present invention relates to replication of data changed in a source database management system (DBMS) to a target DBMS in real time, and more particularly, to an apparatus and a method for replicating changed-data in a source database management system to a target database management system in real time, which are capable of minimizing the load on the source DBMS system, reducing configuration costs of DBMS hardware, and facilitating operation and failure recovery.

2. Description of the Related Art

The database replication is one of the distributed database technologies for replicating an object stored in one database to another database physically separated from the one database so that the object can be used in at least two database servers. According to the above replication technology, accesses of applications using the same object are distributed to multiple database servers so as to increase performance or allow the replicated database server to be used for other purposes, so that requirements for different operations can be satisfied. In addition, when the failure occurs in a database server in operation, the replicated database server is quickly replaced, so that it may be very useful when urgently coping with the failure and the like.

In general, Standby DB of Oracle Company is widely used as a replication system in enterprises and the like.

The Oracle DBMS records changes of data in an online log file, and the online log file has a limit in a predetermined size, thus the changes of the data are continuously recorded in another log file when the capacity of the online log file being recorded reaches the limit. At this time, the existing online log file in which data recording has been finished is stored after changed into a log file which is an archive format. The Oracle Standby DB transmits the archive log file to the target server whenever the existing online log file is switched into the archive log file in the source server. The target server receiving the archive log file automatically or manually applies the changes of the archive log file to maintain data the same as the source server. In other words, data between the target server and the source server is synchronized whenever the archive log file is transmitted from the source server to the target server.

Figure 1:
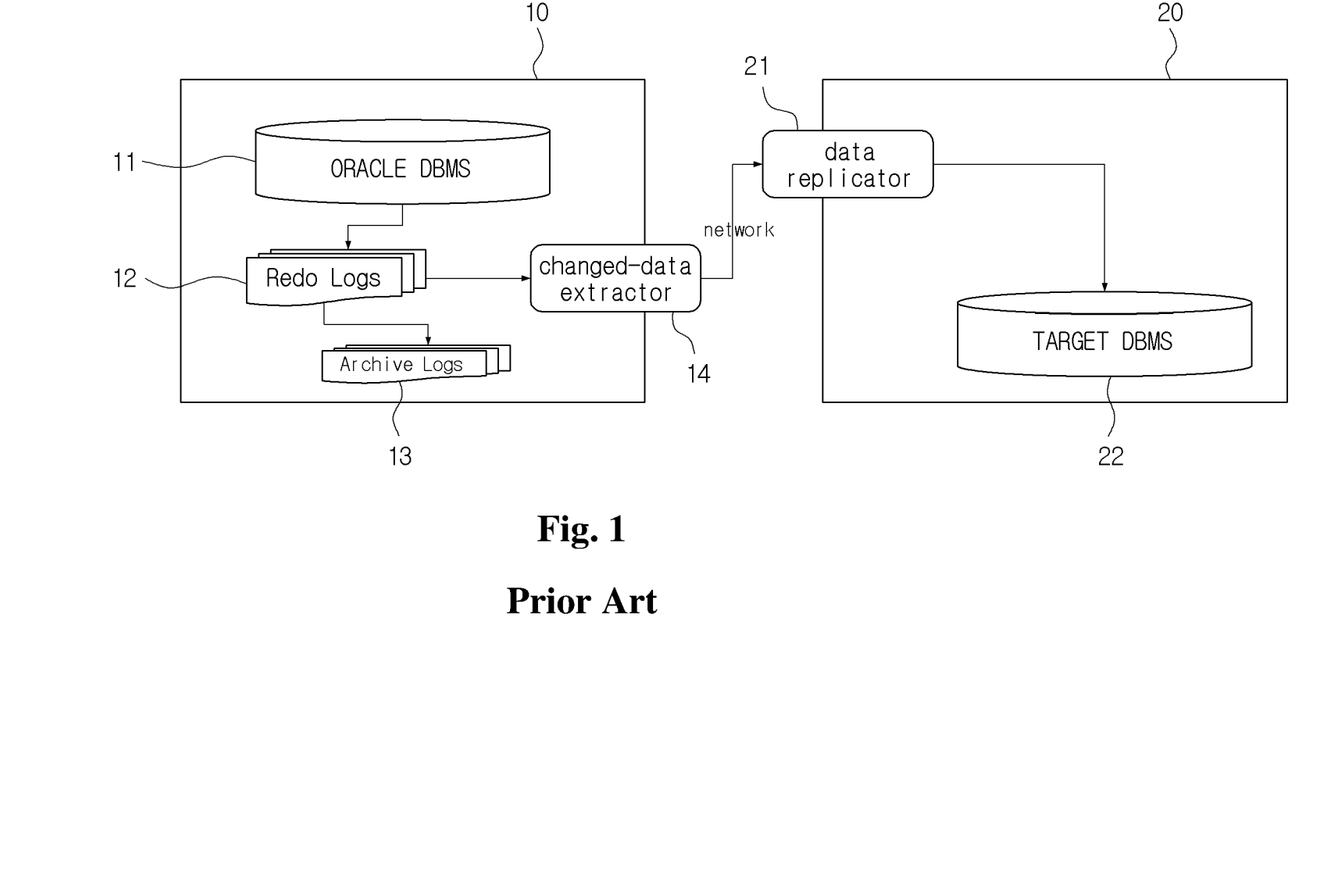
FIG. 1 is a schematic view showing a structure of a general Oracle DBMS system.

FIG. 1 shows a structure for database replication of the Oracle DBMS.

As shown in FIG. 1, the replication structure of the Oracle DBMS is divided into a source server 10 and a target server 20. The source server 10 includes: a source DBMS 11; a redo logs storage unit 12 for storing changed-data of the source DBMS 11 and storing a history for data changes; an archive log storage unit 13 for storing the changed-data in an archive log file by interworking with the redo log storage unit 12; and a changed-data extractor 14 for extracting the changed-data by searching the redo log storage unit 12 and the archive log storage unit 13 to transmit only the data to be replicated to the target server 20 via networks.

Herein, the redo log storage unit 12 and the archive log storage unit 13 are included in the actual source DBMS 11.

The target server 20 includes a data replicator 21 for replicating the changed-data transmitted in real time from the source server 10 via the networks to the target DBMS 22 by using APIs or utility tools.

Operations of the data replication system of the Oracle DBMS configured in the above manner and commonly used in enterprises will be briefly described as follows.

First, when the changed-data is generated in the source DBMS 11 inside the source server 10, the redo log storage unit 12 stores the changed-data for recovery before changing data of the source DBMS 11. Herein, the redo log storage unit 12 also serves to store all histories for the data changes. In addition, the redo log storage unit 12 converts the changed-data into an archive log file to store the converted archive log file in the archive log storage unit 13.

The changed-data extractor 14 of the source server 11 searches the redo log storage unit 12 and the archive log storage unit 13 to extract the changed-data, and when the changed-data is extracted, the changed-data is transmitted to the target server 20 through the networks in real time.

The data replicator 21 of the target server 20 replicates the changed-data transmitted in real time from the source server 10 through the networks to the target DBMS 22 by using the APIs or the utility tools.

Meanwhile, the conventionally proposed techniques for replicating a database of a DBMS are disclosed in Patent Documents 1 to 3 as follows.

The related art disclosed in Patent Document 1 includes the steps of: generating a replication log through a transaction log of a master database in a master host and transmitting the replication log to a distribution system (a distributor); determining a slave host in charge of distributing the replication log in the distribution system, and distributing the replication log to the corresponding slave host; and receiving the replication log in the slave host such that the replication log is reflected in slave database.

According to the above configuration, the aggravated load in the database can be distributed through the master database, the slave database, and the distributing system, and any one of the slave hosts can be replaced as a master host, thereby effectively coping with the failure when a failure occurs in a master host including the master database.

In addition, the related art disclosed in Patent Document 2 includes the steps of: receiving, by first backup agent, a redo log header of a redo log file; determining whether the previously stored log sequence number is matched with the current log sequence number of the received redo log header; applying, by the first backup agent, the previously received redo log when the numbers are matched, as a result of the determination; and modifying redo log information stored in the first backup database when it is determined that the numbers are not matched and the failure of the active database occurs.

According to the above configuration, there is provided an automatic recovery system by real-time database replication, for minimizing data loss and shortening the recovery time.

In addition, the related art disclosed in Patent Document 3 includes: a replication target server having a replication target disk in which data to be replicated is stored, and a first agent configured to divide data blocks in the replication target disk into a plurality of predetermined unit data, compute a predetermined section, capture the predetermined unit data for the predetermined section by multiple threads, and transmit the predetermined unit data for the captured thread to a queue, and configured to compute another section next to the above predetermined section to capture predetermined unit data in the another section; and a replication server having a second agent configured to analyze each of the predetermined unit data received from the first agent to create replication data by the multiple threads, and a replication disk for storing the replication data created from the second agent.

According to the above configuration, data replication is performed in real time using a multi-thread scheme.

Patent Document (Patent document 1) Korean Patent Registration No. 10-0926880 (Nov. 6, 2009 Registered), DATA REPLICATION METHOD AND SYSTEM FOR DATABASE MANAGEMENT SYSTEM (Patent document 2) Korean Patent Registration No. 10-0891036 (Nov. 6, 2009 Registered) AUTOMATIC RECOVERY SYSTEM FOR DATABASE USING REAL-TIME REPLICATION AND ITS METHOD (Patent document 3) Korean Patent Registration No. 10-1374533 (Mar. 6, 2014 Registered) HIGH PERFORMANCE REPLICATION SYSTEM AND BACKUP SYSTEM FOR MASS STORAGE DATA, METHOD OF THE SAME

SUMMARY OF THE INVENTION

However, the above general Oracle DBMS system and the related art adopt the scheme in which the changed-data is extracted in an origin server (source server) by using the data extractor, transmitted to the target server via the networks and replicated, thus load resources of the source server are used, which causes the load of the sources to be increased.

In addition, the Oracle real application cluster (RAC) is basically composed of a shared disk, and a free disk space is required for maintaining multiple archive logs when a change data capture (CDC) product is adopted, thus there is a disadvantage in that additional costs are required for the hardware configuration.

Accordingly, the present invention is proposed to solve the above problems in the related art, the present invention provides an apparatus and a method for replicating changed-data in a source database management system to a target database management system in real time, which are capable of minimizing the load on the source DBMS system, reducing configuration costs of DBMS hardware, and facilitating operation and failure recovery.

To achieve the above-mentioned object, the apparatus and the method for replicating changed-data in a source database management system to a target database management system in real time according to the present invention in a system for synchronizing data between a source server and a target server by replicating changed-data of the source server to the target server, wherein the source server transmits changed-data in a redo log file or an archive log file of a source DBMS area in real time to the target server, and the target server receives the changed-data transmitted from the source server to temporarily store the changed-data in a local area, and extracts the change data stored in the local area to replicate the extracted changed-data to the target DBMS.

The source server and the target server transmit and receive the changed-data in a log file format to synchronize the data between the source DBMS and the target DBMS in real time.

The source server includes a first log synchronizer for transmitting the changed-data from the redo log or archive log file of the source DBMS area to the target server in a log file format in real time.

The first log synchronizer includes a data transmitter for transmitting the changed-data from the redo log file and the archive log file to the target server in real time.

The target server includes: a second log synchronizer for replicating the changed-data transmitted from the source server to the local system area; a log file storage unit for storing the changed-data replicated in the second log synchronizer as a log file; and a changed-data extraction and replication unit for extracting the changed-data from the redo log file or the archive log file stored in the log file storage unit, and replicating the extracted changed-data to the target DBMS.

The second log synchronizer includes: a data receiver for receiving the changed-data transmitted through the networks from the source server to replicate the received changed-data in the local system area; a backup unit for managing the redo log file and the archive log file periodically used; and a recovery unit for performing a recovery function upon a failure of a network or system.

The log file storage unit includes: a redo log file storage unit for storing the redo log file; and an archive log file storage unit for storing the archive log file.

The changed-data extraction and replication unit includes: a changed-data extractor for extracting the changed-data from the redo log file or the archive log file stored in the log file storage unit; and a changed-data replication unit for replicating the changed-data extracted by the changed-data extractor to the target DBMS.

To achieve the above-mentioned object, the method of replicating changed-data in a source database management system to a target database management system in real time according to the present invention includes the steps of: (a) confirming an existence of synchronization target log in a source server when log file synchronization is preliminarily prepared; (b) performing synchronization error processing when the synchronization target log is not found in the source server in step (a), or establishing a synchronization network connection between the source server and a target server through a log synchronization process when the synchronization target log exists in the source server; (c) transmitting changed-data of a redo log file and an archive log file in a log file format from the source server to the target server; (d) generating a synchronization network error event through network monitoring when the synchronization network connection to the target server is not established in a state that log replication is preliminarily prepared; (e) performing the log synchronization process when the synchronization network connection to the target server is established; (f) when the log synchronization process is normally performed in step (e), analyzing a log synchronization type in the target server and receiving the changed-data when the log synchronization type is a log synchronization file to synchronize the changed-data through a replication process; and (g) receiving entire changed-data and storing the entire changed-data in a memory when the log synchronization type analyzed in the target server is not the log synchronization file.

Step (a) includes: (a1) setting a real application cluster (RAC) node for an Oracle replication target; (a2) checking completion of the preliminary preparation for the replication; (a3) creating a log replication list management table and executing synchronization for entire redo logs when the preliminary preparation for the replication is not completed;

(a4) checking a recovery time-point after the preliminary preparation for the replication is completed or after the synchronization for the entire redo logs is executed; (a5) setting a current time-point log file synchronization mode when it is not the recovery time-point, or setting a past time-point log file synchronization mode when the recovery time-point is confirmed, as a result of checking the recovery time-point.

Step (b) includes: (b1) confirming whether the synchronization target log is found; (b2) transmitting confidential reporting system (CRS) control monitoring data to the target server and checking a status of the synchronization network when the synchronization target log is not found; (b3) going to step (b1) when a synchronization error does not occur as a result of checking the status of the synchronization network, or confirming whether there is a retry when the synchronization error occurs as a result of checking the status of the synchronization network; (b4) reporting the error when there is no retry in step (b3) and finishing the log synchronization, or resetting a synchronization time-point when the retry occurs and going to step (b1); (b5) entering a log synchronization mode to create a synchronization thread, analyzing the synchronization log type, and executing the synchronization network connection when the synchronization target log is found.

Step (c) includes: (c1) confirming whether a log file to be transmitted to the target server is the redo log file; (c2) confirming existence of a changed-data block when the log file to be transmitted to the target server is the redo log file, and transmitting the changed-data block to the target server when the changed-data block exists; (c3) transmitting an event of archive log generation when the transmission of the redo log file is completed; (c4) analyzing an archive log to measure and transmit a changed archive log data block when the log file transmitted to the target server is not the redo log file; (c5) completing the archive log generation after the archive log data block is transmitted; and (c6) after the redo log file and the archive log file are transmitted from the target server, generating an error event when a response message is not received, or generating a success event and finishing the log synchronization when the response message is received.

Step (d) includes: (d1) checking a state of preliminary preparation for log synchronization, creating a log replication repository when the preliminary preparation is not completed, checking whether a redo replication initially occurs, and generating a server socket when the redo replication initially occurs; (d2) checking a state of establishing the synchronization network connection, transmitting monitoring data to the source server when the synchronization network connection is not established; (d3) receiving a response state of the source server, and going to step (d2) when the response state is not an error state, or generating an error event and finishing the log synchronization when the response state is an error state.

Step (e) includes: (e1) entering a log synchronization mode when the synchronization network connection is established, for generating a synchronization data reception process, transferring a synchronization network object, and verifying a network authentication.

Step (f) includes: (f1) receiving the changed-data to synchronize the changed-data through the replication process when the log synchronization type is a redo log synchronization file after analyzing the log synchronization type; (f2) generating an archive log when the synchronizing the changed-data is completed; and (f3) transmitting a synchronization result to the source server via the network, and finishing the log synchronization.

According to the present invention, when the changed-data of the source DBMS system is generated, the redo log file and the archive log file generated for recovery upon generation of the changed-data are simply replicated to the target server without performing a process of extracting the changed-data, such that the load on the source DBMS system can be minimized.

In addition, according to the present invention, the replication scheme of the log file is used, thus a free disk space for maintaining the archive log is not required as compared to the conventional recovery, such that costs for additional hardware implementation can be reduced.

In addition, according to the present invention, it is easier than the process operated upon replication and recovery in the conventional DBMS system, such that a failure recovery can be easily performed.

DETAILED DESCRIPTION OF THE INVENTION

Hereinafter, an apparatus and a method for replicating changed-data in a source database management system to a target database management system in real time according to a preferred embodiment of the present invention will be described in detail with reference to the accompanying drawings.

Figure 2:
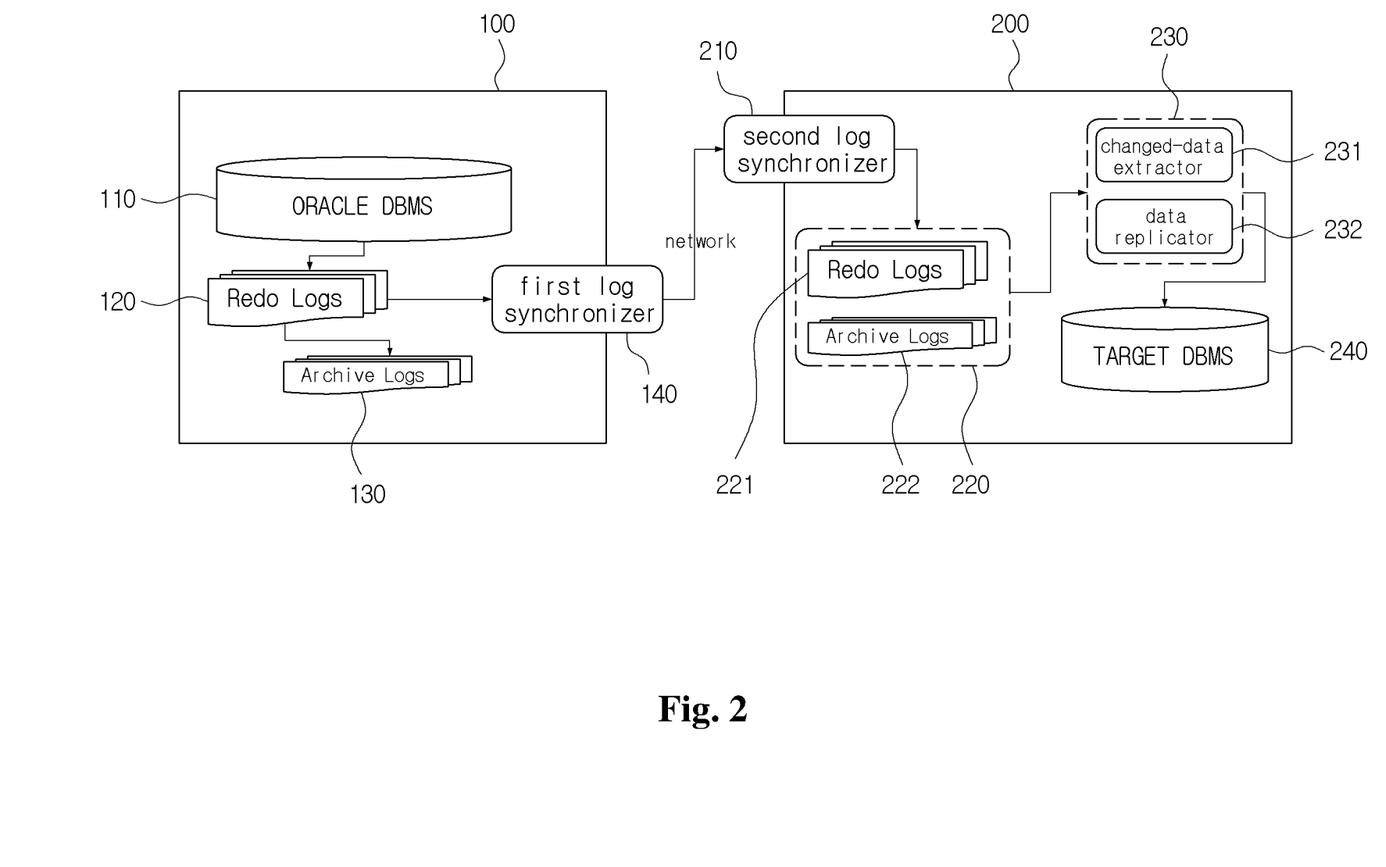
FIG. 2 is a schematic view showing an apparatus for replicating changed-data in a source database management system to a target database management system in real time according to the present invention.

FIG. 2 is a schematic view showing an apparatus for replicating changed-data in a source database management system to a target database management system in real time according to a preferred embodiment of the present invention.

The apparatus for replicating changed-data in a source database management system to a target database management system in real time according to the present invention includes a source server 100 and a target server 200, in which the changed-data of the source server 100 is replicated to the target server 200 in a log file format, thereby implementing real-time data synchronization between the source server 100 and the target server 200.

Herein, the source server 100 transmits the changed-data from a redo log file or an archive log file in an area of the source DBMS to the target server 200 in real time.

To this end, the source server 100 includes a first log synchronizer 140 for transmitting the changed-data from the redo log file or archive log file of the source DBMS area to the target server 200 in a log file format in real time. Herein, the first log synchronizer 140 may include a data transmitter for transmitting the changed-data from the redo log file and the archive log file to the target server 200 in real time.

In addition, the source server 100 further includes a redo logs storage unit 120 for storing the changed-data of the source DBMS 110 and storing a history of data changes; and an archive log storage unit 130 for storing the changed-data in an archive log file by interworking with the redo log storage unit 120.

In addition, it is preferable that the target server 200 receives the changed-data transmitted from the source server 100, temporarily stores the changed-data in a local area, and extracts the changed-data stored in the local area to replicate the extracted changed-data to the target DBMS 240.

The above target server 200 include: a second log synchronizer 210 for replicating the changed-data transmitted from the source server 100 to the local system area; a log file storage unit 220 for storing the changed-data replicated in the second log synchronizer 210 as a log file; and a changed-data extraction and replication unit 230 for extracting the changed-data from the redo log file or the archive log file stored in the log file storage unit 220, and replicating the extracted changed-data to the target DBMS 240.

The second log synchronizer 210 includes: a data receiver for receiving the change data transmitted through networks from the source server 100 to replicate the received changed-data in the local system area; a backup unit for managing redo log files and archive log files which are periodically used; and a recovery unit for performing a recovery function upon a failure of a network or system.

In addition, the log file storage unit 220 includes: a redo log file storage unit 221 for storing the redo log file; and an archive log file storage unit 22 for storing the archive log file.

In addition, the changed-data extraction and replication unit 230 includes: a changed-data extractor 231 for extracting the changed-data from the redo log file or the archive log file stored in the log file storage unit 220; and a changed-data replication unit 232 for replicating the changed-data extracted by the changed-data extractor 231 to the target DBMS 240.

Operations of the apparatus for replicating the changed-data in the source database management system to the target database management system in real time configured in the above manner according to the preferred embodiment of the present invention will be described in detail as follows.

First, when the changed-data is generated in the source DBMS 110 of the source server 100, the redo log storage unit 120 stores the changed-data for recovery before changing data of the source DBMS 110. Herein, the redo log storage unit 120 also serves to store all histories of data changes. In addition, the redo log storage unit 120 converts the changed-data into an archive log file to store the converted archive log file in the archive log storage unit 130.

Accordingly, when the changed-data is generated in the source DBMS 110 of the source server 100, the source server 100 transmits the changed-data in real time to the target server 200 interworked through networks to replicate the changed-data to the source server 100 and the target server 200, thereby implementing the data synchronization.

According to the related art, a change data extractor for extracting the changed-data is included in a source server, and the changed-data is extracted and transmitted to a target server through networks, thus load resources of the source server are used, which causes the load of the sources to be increased. In addition, RAC is basically composed of a shared disk, and a free disk space is required for maintaining multiple archive logs when a CDC product is adopted, thus hardware is required for additional implementation, thereby causing additional costs for the hardware implementation.

In order to solve all the problems caused upon data replication between the conventional source server and target server, the present invention implements the log synchronization, such that the load on the source server can be minimized, and removes the free disk space due to the maintenance of archive logs, such that the costs for the additional hardware implementation can be removed.

For example, the first log synchronizer 140 of the source server 100 transmits the changed-data from the redo log file or archive log file of the source DBMS area to the target server 200 in a log file format in real time by using an internal data transmitter. Herein, the redo log is composed of a block unit, and the unit for storing the changed-data is also a block unit. One data block is composed of 512 bytes in most cases. At this time, the first log synchronizer 140 acquires the changed-data in a log file format, without separately extracting the changed file, by interlocking with a redo log storage unit 120 for independently processing the changed-data in the source server 100 and managing the changed-data history and an archive log storage unit 130 for storing the changed-data as an archive log file. Therefore, any operation for extracting the changed-data is unnecessary in the source server 100, thereby minimizing the load on the source server 100.

In addition, the first log synchronizer 140 transmits a log file corresponding to the changed-data to the target server 200 through log synchronization of the target server 200 via the networks. Herein, the file is transmitted in the form of the redo log file or the archive log file, and the term 'log synchronization' signifies that both log files are synchronized with each other.

The second log synchronizer 210 of the target server 200 receives the changed-data transmitted from the source server 100 by using an internal data receiver, and replicates the received changed-data to the log file storage unit 220 which is a local system area. Herein, the local system area is not the target DBMS 240 but an area for temporarily storing log files, and means a storage area such as the redo log storage unit 120 and the archive log storage unit 130 of the actual source server 100.

In addition, the second log synchronizer 210 includes a backup unit and a recovery unit, in which the backup unit manages the redo log file and the archive log file which are periodically used, and the recovery unit performs a recovery function upon a failure of a network or system.

In addition, the log file storage unit 220 stores the changed-data in the redo log storage unit 221 when the changed-data is the redo log file, and stores the changed-data in the archive log storage unit 222 when the changed-data is the archive log file.

When the changed-data is stored in the log file storage unit 220, the change data extraction and replication unit 230 extracts the changed-data from the redo log file or the archive log file stored in the log file storage unit 220, and replicates the extracted changed-data to the target DBMS 240.

For example, in the changed-data extraction and replication unit 230, the changed-data extractor 231 extracts the changed-data from the redo log file or the archive log file stored in the log file storage unit 220, and the changed-data replication unit 232 replicates the changed-data extracted by the changed-data extractor 231 to the target DBMS 240.

Herein, the scheme of extracting the changed-data from the log file and replicating the extracted changed-data to the target DBMS 240 is performed in the same manner as the conventional scheme.

Figure 3A:
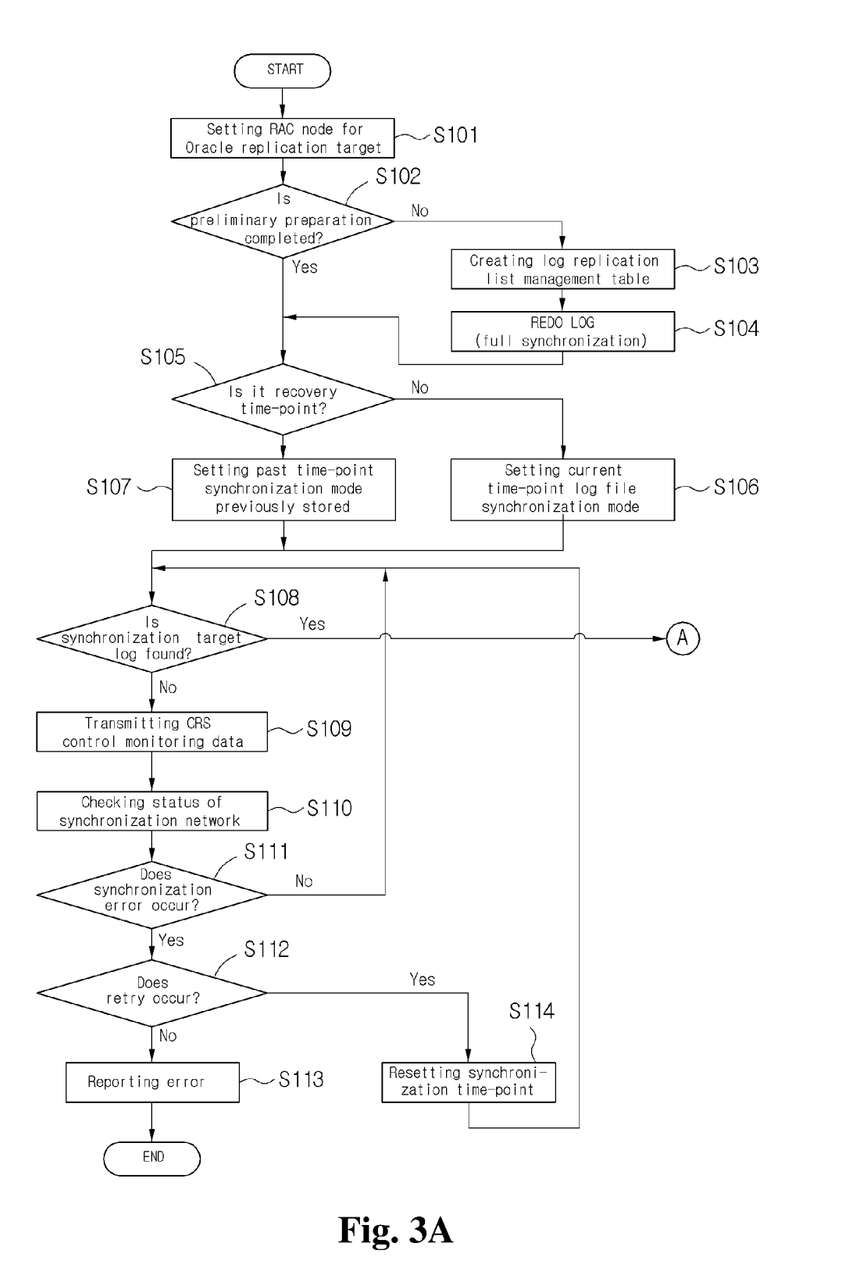
FIGS. 3A and 3B are flowcharts showing processes of replicating changed-data from a source DBMS to a target DBMS according to the present invention.
Figure 3B:
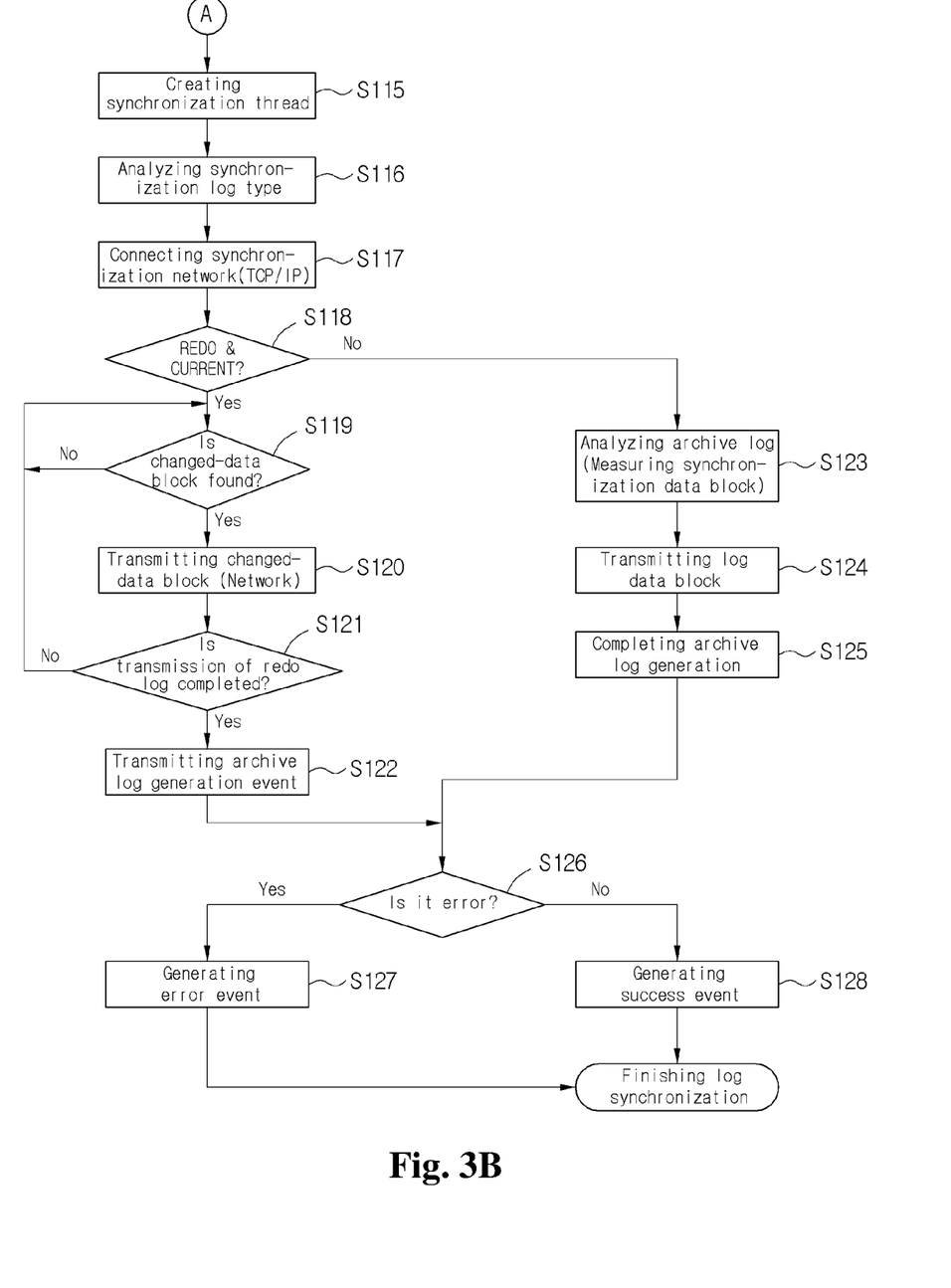
Figure 4A:
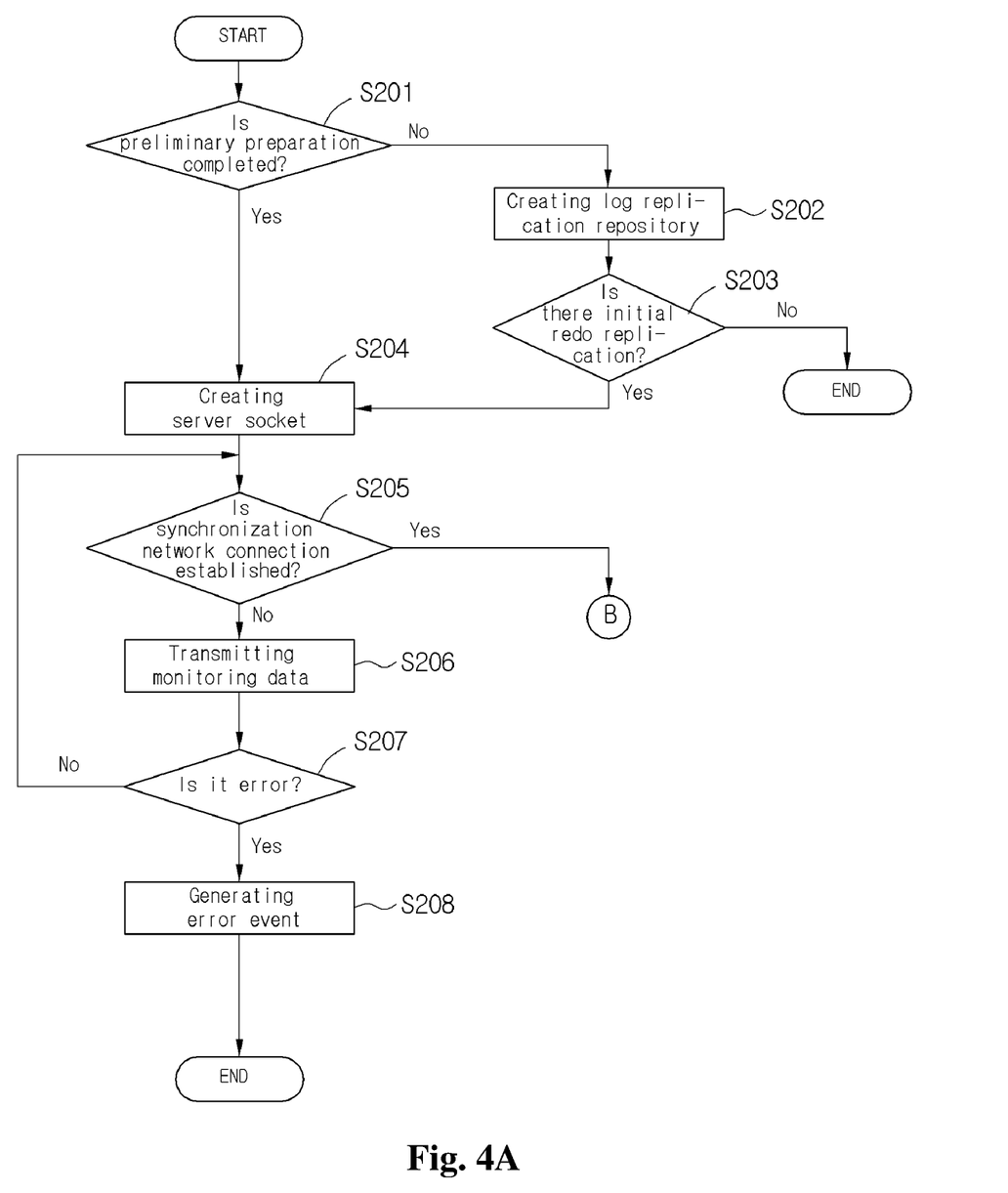
FIGS. 4A and 4B are flowcharts showing processes of receiving and replicating changed-data in a target DBMS according to the present invention.
Figure 4B:
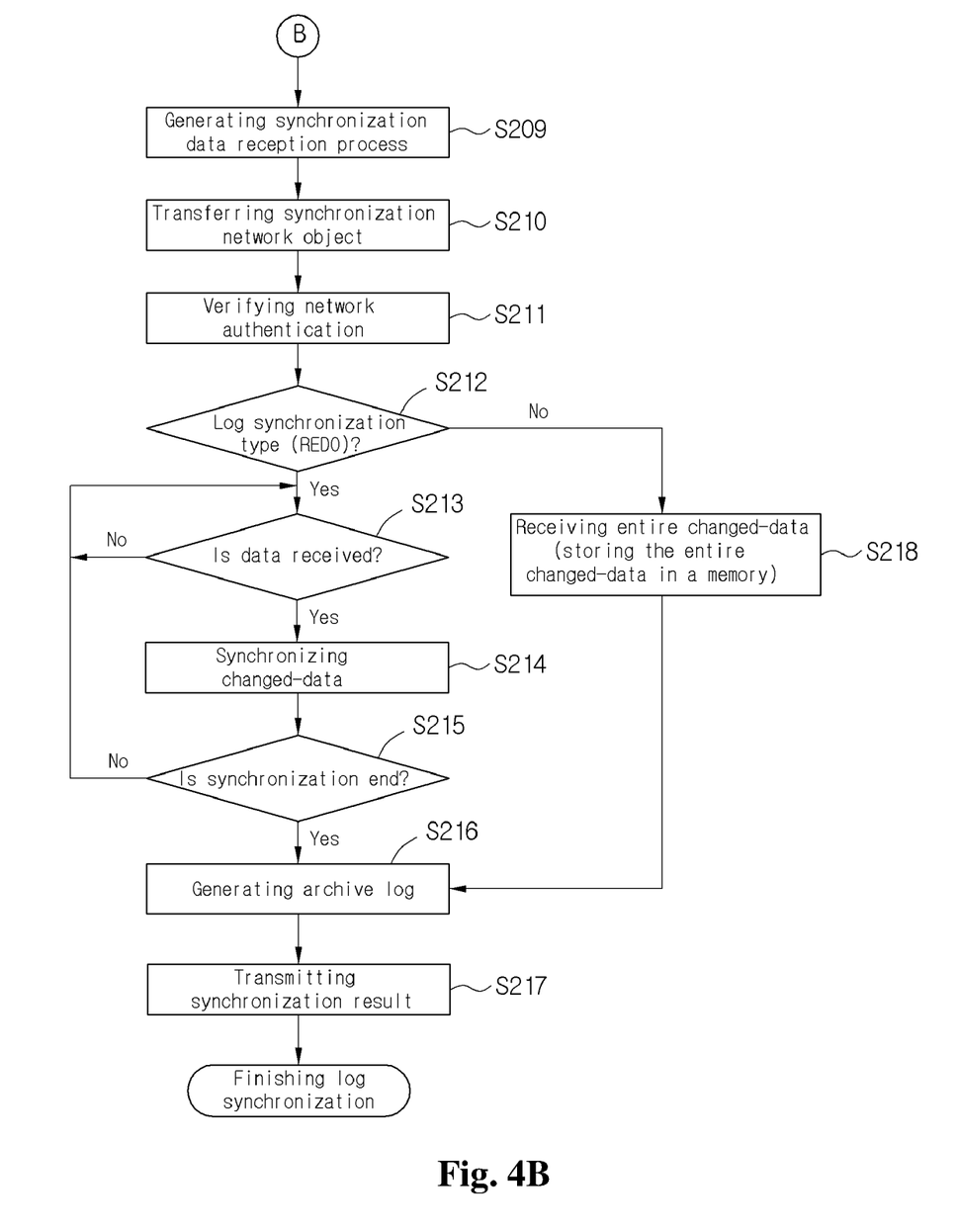

FIGS. 3a and 3b are flowcharts showing processes of replicating changed-data from the source DBMS to the target DBMS according to the present invention, and FIGS. 4a and 4b are flowcharts showing processes of receiving and replicating the changed-data by the target DBMS according to the present invention.

The method of replicating the changed-data in the source database management system to the target database management system in real time according to the present invention includes: (a) confirming an existence of a synchronization target log in the first log synchronizer 140 of the source server 100 when log file synchronization is preliminarily prepared (S101 to S108); (b) performing synchronization error processing when the synchronization target log is not found in the first log synchronizer 140, or establishing a synchronization network connection between the source server and a target server through a log synchronization process when the synchronization target log exists (S109 to S114); (c) transmitting changed-data of the redo log file and the archive log file in a log file format from the first log synchronizer 140 to the target server (S115 to S128); (d) generating a synchronization network error event through network monitoring when the synchronization network connection is not established in a state that log replication is preliminarily prepared in the second log synchronizer 210 of the target server 200 (S201 to S208); (e) performing the log synchronization process when the synchronization network connection is established in the second log synchronizer 210 (S209 to S211); (f) analyzing a log synchronization type in the changed-data extraction and replication unit 230 when the log synchronization process is normally performed, and receiving the changed-data when the log synchronization type is a log synchronization file to synchronize the changed-data through a replication process (S212 to S217); and (g) receiving entire changed-data and storing the entire changed-data in a memory when the log synchronization type analyzed in the changed-data extraction and replication unit 230 is not the log synchronization file (S218).

The method of replicating the changed-data in the source database management system to the target database management system in real time according to the present invention will be described in detail as follows.

First, the first log synchronizer 140 of the source server 100 performs preliminary preparation for log file synchronization, and checks whether the synchronization target log exists when the preliminary preparation for the log file synchronization is completed.

For example, in step S101, a real application cluster (RAC) node for Oracle replication target is set. In step S102, it is checked whether the preliminary preparation for replication is completed. When the preliminary preparation for replication is not completed, the process goes to step S103 to create a log replication list management table, and the process goes to step S104 to execute a redo log (full synchronization).

Next, in step S105, a recovery time-point is checked after the preliminary preparation for the replication is completed in step S102 or after the synchronization for the full synchronization for the redo log is executed. After checking the recovery time-point, when it is not the recovery time-point, the process goes to step S106 to set the synchronization time-point as a current time-point log file synchronization mode, or when the recovery time-point is conformed, the process goes to step S107 to set the synchronization time-point as a past time-point synchronization mode which is previously stored.

Next, after setting the synchronization mode, it is checked whether the synchronization target log is found in the first log synchronizer 140. Then, synchronization error processing is performed when the synchronization target log is not found, or the connection between the synchronization network and the target server is established through the log synchronization process when the synchronization target log exists.

For example, in step S108, it is checked whether the synchronization target log is found. When the synchronization target log is not found, the process goes to step S109 to transmit confidential reporting system (CRS) control monitoring data to the target server 200. Then, in step S110, a status of the synchronization network is checked. Herein, various known schemes may be used for checking the status of the synchronization network, and it is assumed that a scheme of transmitting specific data and receiving a response is used in the present invention.

After checking the status of the synchronization network, it is confirmed whether a synchronization error occurs in step S111. When the synchronization error does not occur, the process goes to step S108 to recheck whether the synchronization target log is found. Otherwise, after the status of the synchronization network is checked, if it is determined that a synchronization error occurs, the process goes to step S112 to confirm whether retry occurs.

As a result of the check in step S112, when it is not a retry, the process goes to step S113 to report the error and finish the log synchronization. Otherwise, when it is a retry, the process goes to step S114 to reset the synchronization time-point, and the process goes to step S108.

In addition, as a result of the check in step S108, when the synchronization target log is found, the process goes to step S115 to enter a log synchronization mode to create a synchronization thread.

After the synchronization log type is analyzed in step S116, a synchronization network (TCP/IP) connection is executed in step S117.

Next, the first log synchronizer 140 transmits the changed-data of the redo log file and the archive log file to the target server 200 in a log file format.

For example, in step S118, it is checked whether the log file to be transmitted to the target server 200 is a redo file. When the log file to be transmitted to the target server 200 is the redo file, the process goes to step S119 to check whether a changed-data block exists.

As a result of the above check, when there is a changed-data block, the process goes to step S120 to transmit the changed-data block to the target server 200. Next, in step S121, it is checked whether the transmission of the redo log file is completed. When the transmission of the redo log file is not completed, an operation of transmitting the changed-data block is performed, or when the transmission of the redo log file is completed, the process goes to step S122 to transmit an archive log generation event to the target server 200.

In addition, as a result of the confirmation in step S118, when the log file transmitted to the target server 200 is not the redo file, the process goes to step S123 to analyze the archive log to measure the changed archive log data block, and the log data block is transmitted to the target server 200 in step S124. Next, in step S125, the archive log data is transmitted and then the archive log generation is completed.

Next, in step S126, the redo log file and the archive log file are transmitted from the target server 200. When a response message is not received, the process goes to step S127 to generate an error event. When the response message is normally received, the process goes to step S128 to generate a success event, and then the log synchronization is finished.

The log file according to the changed-data is transmitted from the source server 100 to the target server 200 through the above processes.

Meanwhile, the second log synchronizer 210 of the target server 200 generates a synchronization network error event through network monitoring when a synchronization network connection is not established in a state that the preliminary preparation for log replication is completed.

For example, in step S201, it is checked whether preliminary preparation for log synchronization is completed. When the preliminary preparation is not completed, the process goes to step S202 to create a log replication repository. In step S203, it is checked whether redo replication initially occurs. When the redo replication does not initially occur, the process stops. When the redo replication initially occurs, the process goes to step S204 to create a server socket. Likewise, the server socket is immediately created when the preparation for log synchronization is completed.

Next, in step S205, it is checked whether the synchronization network connection is established. When the synchronization network connection is not established, the process goes to step S206 to transmit monitoring data to the source server 100. In addition, in step S207, the response status of the source server is received. When it is not an error state, the process goes to step S205, and when it is an error state, the process goes to step S208 to generate an error event and finish the log synchronization.

In addition, as a result of the check in step S205, when the synchronization network connection is established in the second log synchronizer 210, the log synchronization process is performed.

For example, in step S209, when the synchronization network connection is established, a synchronization data reception process is generated by entering the log synchronization mode. In step S210, a synchronization network object is transferred, and in step S211, a network authentication is verified.

When the log synchronization process is normally performed after the network authentication is verified, the log synchronization type is analyzed by the changed-data extraction and duplication unit 230. When the log synchronization type is a log synchronization file, the changed-data is received to synchronize the changed-data through a replication process.

For example, in step S212, the log synchronization type is analyzed. When the log synchronization type is a redo log synchronization file, the changed-data is received using a data receiver in step S213, and the changed-data is synchronized through the replication process in step S214.

In addition, in step S215, when the synchronization of the changed-data is completed, the process goes to step S216 to create an archive log. In step S217, the synchronization result is transmitted to the source server 100 through the networks, and the log synchronization is finished.

In addition, as a result of analyzing the log synchronization type by the changed-data extraction and replication unit 230, when it is not the log synchronization type, the process goes to step S218 to receive the entire changed-data and store the entire changed-data in the memory. Then, the process goes to step S216 to create an archive log. In step S217, the synchronization result is transmitted to the source server 100 through the networks, and the log synchronization is finished.

The database synchronization between the source server 100 and the target server 200 is implemented through the above processes.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

The present invention may be effectively applied to the technology for synchronizing changed-data between a source server and a target server in a DBMS system in real time.

What is claimed is:

1. A method of replicating changed-data in a source database management system to a target database management system in real time, the method comprising:
(a) confirming an existence of a synchronization target log in a source server when log file synchronization is preliminarily prepared;
(b) performing synchronization error processing when the synchronization target log is not found in the source server in step (a), or establishing a synchronization network connection between the source server and a target server through a log synchronization process when the synchronization target log exists in the source server;
(c) transmitting changed-data of a redo log file and an archive log file in a log file format from the source server to the target server;
(d) generating a synchronization network error event through network monitoring when the synchronization network connection to the target server is not established in a state that log replication is preliminarily prepared;
(e) performing the log synchronization process when the synchronization network connection to the target server is established;
(f) when the log synchronization process is normally performed in step (e), analyzing a log synchronization type in the target server and receiving the changed-data to synchronize the changed-data through a replication process when the log synchronization type is a log synchronization file; and
(g) receiving entire changed-data and storing the entire changed-data in a memory when the log synchronization type analyzed in the target server is not the log synchronization file,
wherein step (a) comprises:
(a1) setting a real application cluster (RAC) node for an Oracle replication target;
(a2) checking completion of the preliminary preparation for the replication;
(a3) creating a log replication list management table and executing synchronization for entire redo logs when the preliminary preparation for the replication is not completed;
(a4) checking a recovery time-point after the preliminary preparation for the replication is completed or after the synchronization for the entire redo logs is executed; and
(a5) setting a current time-point log file synchronization mode when it is not the recovery time-point, or setting a past time-point log file synchronization mode when the recovery time-point is confirmed, as a result of checking the recovery time-point.

2. The method of claim 1, wherein step (e) comprises (e1) entering a log synchronization mode when the synchronization network connection is established, for generating a synchronization data reception process, transferring a synchronization network object, and verifying a network authentication.

3. The method of claim 1, wherein step (f) comprises:
(f1) receiving the changed-data to synchronize the changed-data through the replication process when the log synchronization type is a redo log synchronization file after analyzing the log synchronization type;
(f2) generating an archive log when the synchronizing the changed-data is completed; and
(f3) transmitting a synchronization result to the source server via the network, and finishing the log synchronization.

4. A method of replicating changed-data in a source database management system to a target database management system in real time, the method comprising:
(a) confirming an existence of a synchronization target log in a source server when log file synchronization is preliminarily prepared;
(b) performing synchronization error processing when the synchronization target log is not found in the source server in step (a), or establishing a synchronization network connection between the source server and a target server through a log synchronization process when the synchronization target log exists in the source server;
(c) transmitting changed-data of a redo log file and an archive log file in a log file format from the source server to the target server;
(d) generating a synchronization network error event through network monitoring when the synchronization network connection to the target server is not established in a state that log replication is preliminarily prepared;
(e) performing the log synchronization process when the synchronization network connection to the target server is established;
(f) when the log synchronization process is normally performed in step (e), analyzing a log synchronization type in the target server and receiving the changed-data to synchronize the changed-data through a replication process when the log synchronization type is a log synchronization file; and
(g) receiving entire changed-data and storing the entire changed-data in a memory when the log synchronization type analyzed in the target server is not the log synchronization file,
wherein step (b) comprises:
(b1) confirming whether the synchronization target log is found;
(b2) transmitting confidential reporting system (CRS) control monitoring data to the target server and checking a status of the synchronization network when the synchronization target log is not found;
(b3) going to step (b1) when a synchronization error does not occur, as a result of checking the status of the synchronization network, or confirming whether there is a retry when the synchronization error occurs, as a result of checking the status of the synchronization network;
(b4) reporting the error when there is no retry in step (b3) and finishing the log synchronization, or resetting a synchronization time-point when the retry occurs and going to step (b1); and
(b5) entering a log synchronization mode to create a synchronization thread, analyzing the synchronization log type, and executing the synchronization network connection when the synchronization target log is found.

5. A method of replicating changed-data in a source database management system to a target database management system in real time, the method comprising:
(a) confirming an existence of a synchronization target log in a source server when log file synchronization is preliminarily prepared;
(b) performing synchronization error processing when the synchronization target log is not found in the source server in step (a), or establishing a synchronization network connection between the source server and a target server through a log synchronization process when the synchronization target log exists in the source server;
(c) transmitting changed-data of a redo log file and an archive log file in a log file format from the source server to the target server;
(d) generating a synchronization network error event through network monitoring when the synchronization network connection to the target server is not established in a state that log replication is preliminarily prepared;
(e) performing the log synchronization process when the synchronization network connection to the target server is established;
(f) when the log synchronization process is normally performed in step (e), analyzing a log synchronization type in the target server and receiving the changed-data to synchronize the changed-data through a replication process when the log synchronization type is a log synchronization file; and
(g) receiving entire changed-data and storing the entire changed-data in a memory when the log synchronization type analyzed in the target server is not the log synchronization file,
wherein step (c) comprises:
(c1) confirming whether a log file to be transmitted to the target server is the redo log file;
(c2) confirming existence of a changed-data block when the log file to be transmitted to the target server is the redo log file, and transmitting the changed-data block to the target server when the changed-data block exists;
(c3) transmitting an event of archive log generation when the transmission of the redo log file is completed;
(c4) analyzing an archive log to measure and transmit a changed archive log data block when the log file transmitted to the target server is not the redo log file;
(c5) completing the archive log generation after the archive log data block is transmitted; and
(c6) after the redo log file and the archive log file are transmitted from the target server, generating an error event when a response message is not received, or generating a success event and finishing the log synchronization when the response message is received.

6. A method of replicating changed-data in a source database management system to a target database management system in real time, the method comprising:

(a) confirming an existence of a synchronization target log in a source server when log file synchronization is preliminarily prepared;

(b) performing synchronization error processing when the synchronization target log is not found in the source server in step (a), or establishing a synchronization network connection between the source server and a target server through a log synchronization process when the synchronization target log exists in the source server;

(c) transmitting changed-data of a redo log file and an archive log file in a log file format from the source server to the target server;

(d) generating a synchronization network error event through network monitoring when the synchronization network connection to the target server is not established in a state that log replication is preliminarily prepared;

(e) performing the log synchronization process when the synchronization network connection to the target server is established;

(f) when the log synchronization process is normally performed in step (e), analyzing a log synchronization type in the target server and receiving the changed-data to synchronize the changed-data through a replication process when the log synchronization type is a log synchronization file; and (g) receiving entire changed-data and storing the entire changed-data in a memory when the log synchronization type analyzed in the target server is not the log synchronization file, wherein step (d) comprises:

(d1) checking a state of preliminary preparation for log synchronization, creating a log replication repository when the preliminary preparation is not completed, checking whether a redo replication initially occurs, and generating a server socket when the redo replication initially occurs;

(d2) checking a state of establishing the synchronization network connection, transmitting monitoring data to the source server when the synchronization network connection is not established; and (d3) receiving a response state of the source server, and going to step (d2) when the response state is not an error state, or generating an error event and finishing the log synchronization when the response state is an error state.

\* \* \* \* \*